United States Patent [19]

Morimoto

[11] 4,022,402
[45] May 10, 1977

[54] CONTAINER FOR MAGNETIC TAPE

[75] Inventor: Toshio Morimoto, Hirakata, Japan

[73] Assignee: Matsushita Electric Industrial Co., Ltd., Osaka, Japan

[22] Filed: Nov. 14, 1975

[21] Appl. No.: 632,161

[30] Foreign Application Priority Data

| Nov. 21, 1974 | Japan | 49-142171[U] |
| Nov. 21, 1974 | Japan | 49-142172[U] |
| Nov. 21, 1974 | Japan | 49-142173[U] |
| Dec. 10, 1974 | Japan | 49-149883[U] |
| Dec. 10, 1974 | Japan | 49-149884[U] |
| Dec. 10, 1974 | Japan | 49-149885[U] |

[52] U.S. Cl. .................... 242/199; 360/96
[51] Int. Cl.² ............ G03B 1/04; G11B 15/32; G11B 23/04
[58] Field of Search ............ 242/197–200, 242/55.19 A; 360/60, 92, 96; 352/72, 78 R, 78 A

[56] References Cited

UNITED STATES PATENTS

| 3,900,170 | 8/1975 | Serizawa | 242/198 |
| 3,900,172 | 8/1975 | Kamaya | 242/198 |

*Primary Examiner*—Leonard D. Christian
*Attorney, Agent, or Firm*—Wenderoth, Lind & Ponack

[57] ABSTRACT

A cassette for accommodating a magnetic tape designed for use in a magnetic recording and/or reproducing apparatus includes a protective covering provided at an access opening of the cassette into which access opening a transducer head assembly is adapted to project to contact a portion of the magnetic tape. The protective covering is movable between projected and retracted positions and, when held in the projected position, shields such portion of the magnetic tape. When the protective covering is moved to the retracted position, that portion of the magnetic tape is located outside the cassette for permitting the transducer head assembly to contact the magnetic tape. The cassette is further provided with a braking lever which applies a braking force to both of the cassette reels to prevent the magnetic tape from being loosened.

9 Claims, 10 Drawing Figures

CONTAINER FOR MAGNETIC TAPE

BACKGROUND OF THE INVENTION

The present invention relates to a container for magnetic tape designed for use in a magnetic recording and/or reproducing apparatus.

It is well known that, depending upon the type of magnetic recording and/or reproducing apparatus, which is hereinafter referred to as a magnetic tape player, a container in which magnetic tape is housed is generally referred to as either a "cartridge" or a "cassette". The magnetic tape stored in the cartridge is a substantially endless loop while that in the cassette is unlooped and has both ends secured to respective reels. A recent development is a miniature container or 'micro-cassette' which is similar in structure to, but smaller in size than, the cassette and which is used in a magnetic tape player specifically designed for use with such miniature container.

In any event, the conventional container for magnetic tape is formed at the front thereof with at least two access openings; one for a magnetic recording and/or reproducing transducer head to project thereinto for sliding engagement with the magnetic tape, and the other for either of a capstan and a pinch roller to project thereinto for driving the magnetic tape in cooperation with the other of a capstan and a pinch roller with the magnetic tape sandwiched therebetween.

In the conventional tape container of the type referred to above, consecutive portions of the magnetic tape housed therein are bared to the outside through the access openings, so that the magnetic tape tends to be broken, or otherwise deteriorated. For example, when the magnetic tape within the container is slackened, a portion of the magnetic tape tends to be loosened out of the container particularly through the access opening for the transducer head and would result in formation of one or more traces of breakage and/or bend. This has been often experienced because of the fact that a portion of the magnetic tape located within the access opening for the transducer head is outwardly biased by an elastic back-up element which is necessitated to facilitate a tight sliding contact between the transducer head and the magnetic tape during recording or reproduction of audio information on the magnetic tape.

Moreover, those portions of the magnetic tape located within the access openings tend to be easily touched by the finger of, for example, an operator of a magnetic tape player in an attempt to load the tape container in the magentic tape player.

Once the magnetic tape is impaired in any of these ways, the performance characteristics of the magnetic tape tend to be adversely affected as is well understood by those skilled in the art.

On the other hand, slackening of the magnetic tape within the container obviously results from the fact that reels to which the respective ends of the magnetic tape are secured and which are housed within the tape container are allowed to rotate freely. In order to avoid this, there is known a tape container wherein frictional elements each supported on a leaf spring or like elastic member are constantly engaged to the respective reels to impart a frictional force to these reels.

Since the frictional elements are constantly engaged to the respective reels within the tape container even during the use in a magnetic tape player, there is a possibility that rotation of one of the reels which is coupled to a motor-driven shaft in the magnetic tape player to wind the magnetic tape from the other of the reels onto such one of the reels will be hampered to an extent that fluctuation may occur in the speed of transference of the magnetic tape. Moreover, a consecutive portion of the magnetic tape running from one reel to the other reel is held under tension so constantly that the magnetic tape tends to be easily physically fatigued.

SUMMARY OF THE INVENTION

Accordingly, an essential object of the present invention is to provide an improved container for magnetic tape designed for use in a magnetic tape player, wherein a retractable covering is provided at the access opening for the transducer head for substantially avoiding any possibility of the magnetic tape being touched by hand, with substantial elimination of the disadvantages and drawbacks inherent in the conventional tape container.

Another important object of the present invention is to provide an improved container of the construction referred to above, wherein the protective covering is retracted within the body of the container to expose a portion of the magnetic tape in readiness for contact with the magnetic transducer head when the tape container is loaded in the magnetic tape player in readiness for performance.

A further object of the present invention is to provide an improved container of the construction referred to above, wherein there is further provided braking means for applying a braking force to both of the reels within the tape container so long as the tape container is not loaded in the magnetic tape player.

A still further object of the present invention is to provide an improved container of the construction referred to above, wherein the braking means is brought into an inoperative position with no braking force applied to the reels in response to loading of the tape container in the magnetic tape player.

A still further object of the present invention is to provide an improved container of the construction referred to above, which can be manufactured in a commercially standardized size and without substantially requiring any complicated manufacturing procedure.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings. It is further to be noted that, for the sake of description of the present invention, the tape container to which the present invention is directed will be described by way of a cassette having a pair of spaced reels to which respective ends of a magnetic tape are secured, it being understood that the concept of the present invention can equally be applicable not only to the cassette, but also to the micro-cassette and the cartridge.

Referring first to FIGS 1 to 6, the tape container is shown in the form of a cassette, generally indicated by 10, of commercially standardized size. The cassette 10 accommodates therein a pair of spaced reels 11 and 12 to which respective ends of a magnetic tape T are secured in any known manner.

Figure 4:
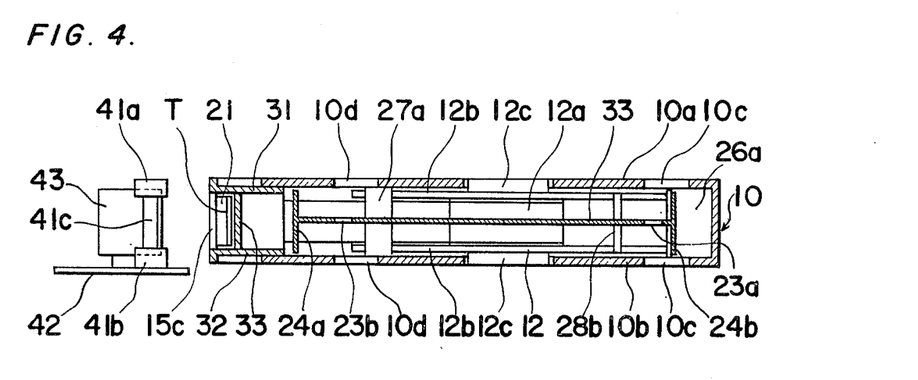
FIG. 4 is a side sectional view of the tape container of FIG. 1, shown in relation to a magnetic transducer head.

Each of the reels 11 and 12 is of double flanged configuration and comprises a cylindrical body 11a or 12a having both ends formed with radially outwardly extending flanges 11b or 12b, and a hub 11c or 12c formed on and outwardly projecting from each end of the cylindrical body 11a or 12a. These reels 11 and 12 are accommodated within the cassette 10 with the hubs 11c or 12c of each of reels 11 or 12 journalled, respectively, to bearing openings formed in top and bottom plate members 10a and 10b of the cassette 10, as best shown in FIG. 4.

The top and bottom plate members 10a and 10b are connected to each other in any known manner by means of a pair of opposed side walls 13 and 14 and a pair of opposed front and rear walls, the rear wall being indicated by 16 while the front wall is to be understood as composed of separate wall portions 15a, 15b, 15c and 15d. A portion of the front edge of each of the plate members 10a and 10b is, as indicated by 17a or 17b, inwardly recessed to provide an access opening into which a transducer head assembly can be penetrated as will be described later.

Access openings 18a and 18b, adapted to receive capstans 19a and 19b extending therethrough when the tape container 10 is loaded in the magnetic tape player (not shown), that is, placed within a cassette receiving chamber of the magnetic tape player, are formed on the front edges of the top and bottom plate members 10a and 10b on respective sides of and adjacent to the access opening defined by the inward recesses 17a and 17b in the plate members 10a and 10b. It is to be noted that each of the access openings 18a and 18b may be in the form of a hole or in the form of a recess such as shown.

In the construction so far described, the magnetic tape T extends from one reel 12 to the other reel 11 first deflected by a roll element 19 and then deflected by another roll element 20, a portion of magnetic tape T between roll elements 19 and 20 extending through the access opening for the transducer head assembly by way of slits 21 and 22 which are respectively formed in the wall portions 15c and 15b.

Slidably extending within the cassette 10 and between the reels 11 and 12 is a braking lever 23, the plane of which lever 23 lies intermediately between the flanges 11b or 12b of each of the reels 11 and 12 as best shown in FIG. 4.

As best shown in FIG. 4, the braking lever 23 has both ends rigidly secured to, or otherwise integrally formed with, respective upright supports 24a and 24b each extending between the top and bottom plate members 10a and 10b so that the braking lever 23 is supported in position with its plane lying substantially intermediately of the height of each of the reels 11 and 12. This braking lever 23 is movable between operative and inoperative positions and is normally biased by a wire spring 25 to the operative position.

For avoiding a displaced movement of the braking lever 23 between the operative and inoperative positions, two sets of pairs of guides 26a, 26b and 27a and 27b are utilized, which guides of each pair are located on lateral sides of the braking lever 23 and concurrently serve as spacers between the top and bottom plate members 10a and 10b.

Figure 1:
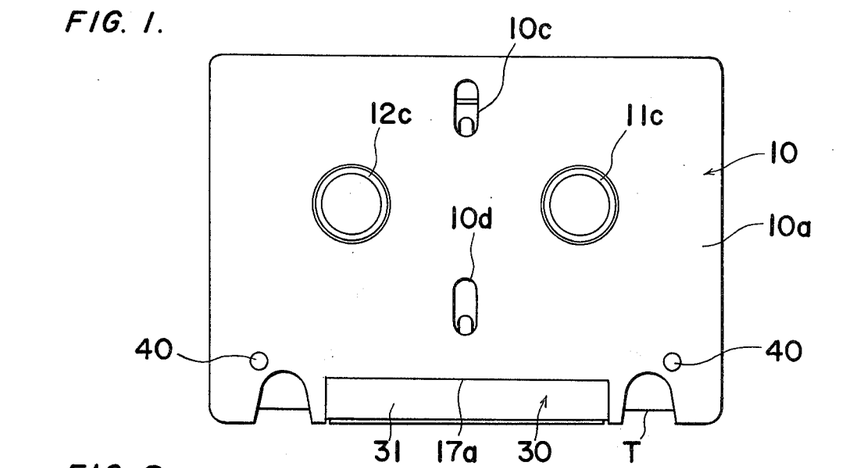
FIG. 1 is a top plan view of a tape container according to the present invention.
Figure 2:
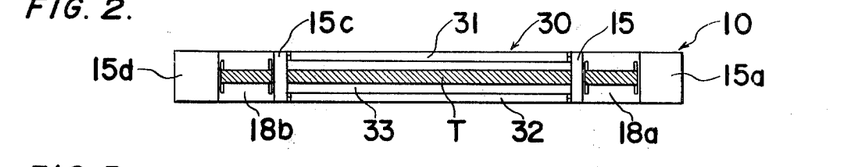
FIG. 2 is a front elevational view of the tape container of FIG. 1.
Figure 3:
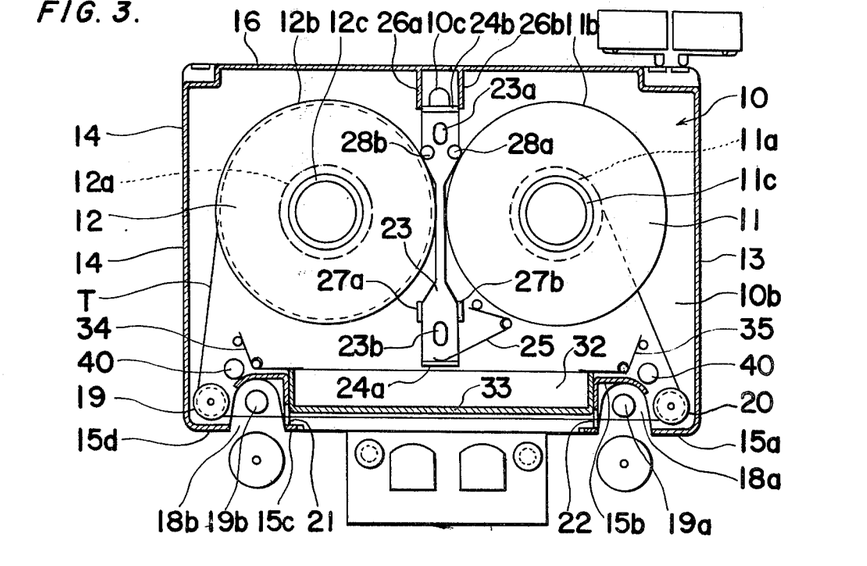
FIG. 3 is a top plan view of the tape container of FIG. 1, with the top casing removed.

The braking lever 23 carries thereon a pair of spaced braking pins 28a and 28b each having both ends terminating adjacent the outer peripheries of the respective flanges of a corresponding one of the reels 11 and 12. More specifically, so long as the braking lever 23 is held in the operative position, the opposite ends of the pin 28a are engaged to the respective flanges 11b of the reel 11, and the opposite ends of the pin 28b are engaged to the respective flanges 12b of the reel 12 as shown in FIG. 3, thereby applying respective braking forces to the reels 11 and 12. However, when the braking lever 23 is moved from the operative position towards the inoperative position against the wire spring 25 in a manner as will be described later, the pins 28a and 28b separate from the flanges 11b and 12b of the respective reels 11 and 12, thereby allowing the reels 11 and 12 to rotate freely.

It is to be noted that, instead of the wire spring 25, any spring element, for example, a compression or tension spring or a leaf spring, may be employed for the same purpose as achieved by the wire spring 25.

The braking lever 23 is formed therein with a pair of spaced slots 23a and 23b which are, when the braking lever 23 is held in the inoperative position, aligned with respective slots 10c and 10d formed on each of the top and bottom plate members 10a and 10b, the function of slots 23a and 23b in cooperation with slots 10c and 10d being described later. However, it is to be noted that, when the braking lever 23 is held in the operative position as shown in FIGS. 1 to 4, one end of each of the slots 23a and 23b, which is situated on the leading side with respect to the direction of movement of the braking lever 23 from the operative position towards the inoperative position is partially overlapped by one end of the corresponding slot 10c or 10d which is situated on the trailing side with respect to the direction of movement of the braking lever 23 from the operative position towards the inoperative position.

Within the access opening for the transducer head assembly which is defined by the inward recesses 17a and 17b, a protective covering generally indicated by 30 is retractably supported in position by the cassette 10. More specifically, the protective covering 30 comprises a pair of spaced, substantially rectangular plate members 31 and 32 connected with each other by means of a wall member 33 which extends in parallel relation to and rearwardly of that portion of the magnetic tape T between the roll elements 19 and 20. The height of the wall member 33 is so selected that the plate members 31 and 32 can be substantially telescopically retractable into the interior of the cassette 10 in a manner as will be described later in connection with the operation of the cassette according to the present invention.

The protective covering 30 of the construction as hereinbefore described is supported in position for movement between projected and retracted positions and is normally biased to the projected position by a pair of spaced wire springs 34 and 35. It is to be noted that the spacing between respective ends of the front wall portions 15b and 15c adjacent the slits 22 and 21 is selected to be so smaller than the width of any of the plate members 31 and 32 that the projected position of the protective covering 30 can be defined by such ends of front wall portions 15b and 15c to which front edges of plate members 31 and 32 abut.

The protective covering 30 may be of one-piece construction.

Figure 8:
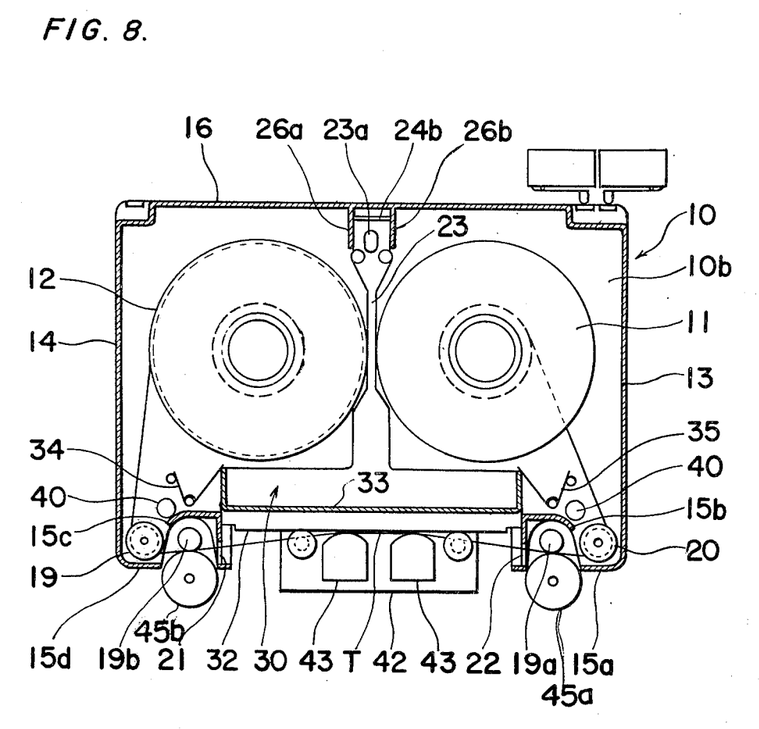
FIG. 8 is a view similar to FIG. 5, showing the tape container according to a further embodiment of the present invention.

In the foregoing embodiment, the braking lever 23 and the protective covering 30 have been described as formed separately. However, as shown in FIG. 8, the braking lever and the protective covering may be connected to, or otherwise integrally formed with, each other. Specifically, this can be attained, for example, by connecting the upright suport 24a of FIGS 1 to 6 to the rear edges of the plate members 31 and 32 of FIGS. 1 to 6. In the embodiment shown in FIG. 8 wherein the braking lever 23 and the protective covering 30 are integral with each other, such elements as the guides 27a and 27b, the slots 23b and 10d and either of the wire spring 25 and the wire springs 34 and 35, which are described as employed in the embodiment of FIGS. 1 to 6 may be omitted. (Even in the embodiment of FIGS. 1 to 6, either of the slots 23a and 23b may not always be necessary.)

Reference numeral 40 employed in FIGS. 1, 3, 5 to 8 and 10 represents a pair of holes formed in the cassette 10 which are adapted to receive corresponding positioning pins (not shown) provided in the cassette receiving chamber of the magnetic tape player for holding the cassette in position within the cassette receiving chamber with the tape T exactly aligned with the transducer head assembly as is well known to those skilled in the art.

So far as the embodiment of FIGS. 1 to 6 is concerned, for moving the braking lever 23 from the operative position towards the inoperative position, at least one actuating pin member is necessary. Although this actuating pin member is not shown in the accompanying drawing, it is to be understood that the actuating pin member has one end situated within the cassette receiving chamber of the magnetic tape player and the other end operatively coupled to a manipulating mechanism accessible to the operator of the magnetic tape player.

With the above in mind, when the cassette 10 of the construction according to the present invention is placed into the cassette receiving chamber of the magnetic tape player, the actuating pin member is inserted through one of the slots 10c and 10d in the cassette 10 and then through the corresponding one of the slots 23a and 23b which is aligned with such one of the slots 10c and 10d. At this time, the positioning pins are also received in the holes 40 for exactly positioning the cassette within the cassette receiving chamber of the magnetic tape player.

Figure 6:
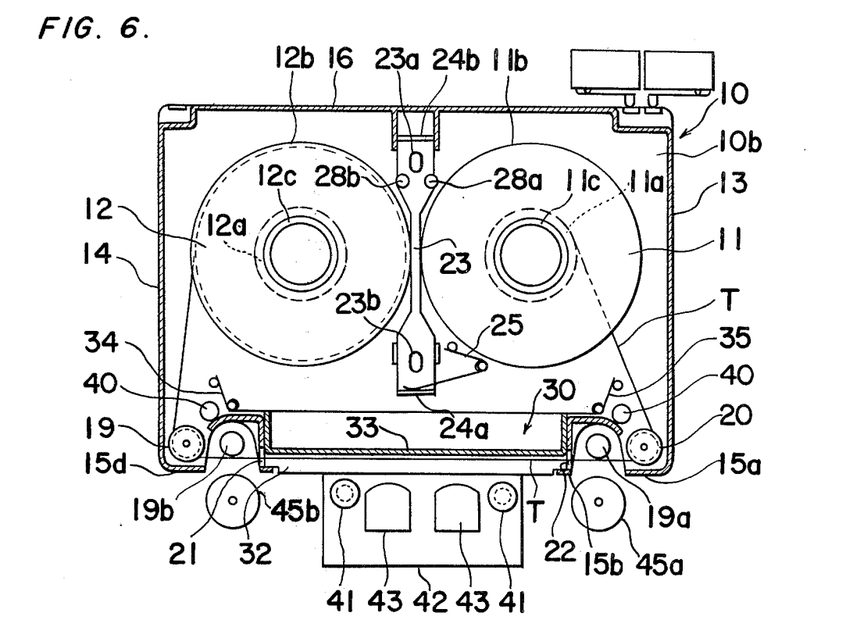
FIG. 6 is a view similar to FIG. 3, showing the tape container loaded in the magnetic tape player with the transducer head held in an inoperative position.

When the manipulating mechanism is subsequently operated in readiness for performance of the magnetic tape player, the actuating pin member is moved along the slot 10c or 10d accompanying a corresponding movement of the braking lever 23 whereby the latter can be moved from the operative position, as shown in FIGS. 3 and 4, to the inoperative position as shown in FIG. 6 with the braking pins 28a and 28b on the braking lever 23 separated from the flanges of the reels 11 and 12. The condition of the braking lever 23 as shown in FIG. 6 is maintained so long as the cassette 10 is accommodated within the cassette receiving chamber of the magnetic tape player.

The actuating pin member, which has been moved to move the braking lever 23 from the operative position to the inoperative position may be designed so as to return to the original position in response to either removal of the cassette 10 out of the cassette receiving chamber of the magnetic tape player or return of the manipulating mechanism.

Alternatively, instead of the use of the manipulating mechanism including the above described actuating pin member, at least one stationary pin may be employed, in which case the stationary pin must project from the bottom of the cassette receiving chamber of the magnetic tape player within the cassette receiving chamber. Specifically, the stationary pin is designed to have one end rigidly secured to the bottom of the cassette receiving chamber of the magnetic tape player and the other end substantially outwardly tapered so that, when the cassette 10 is placed within the cassette receiving chamber, the braking lever 23 can be moved from the operative position towards the inoperative position as the tapered end of the stationary pin penetrating through the slot 10c or 10d of the cassette 10 is inserted through the slot 23a or 23b on the braking lever 23.

Figure 5:
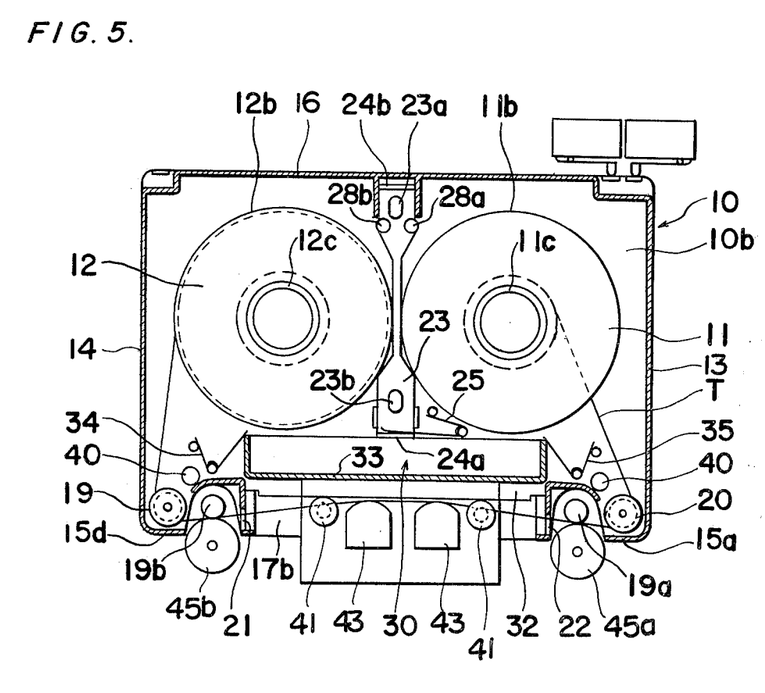
FIG. 5 is a view similar to FIG. 3, showing the tape container loaded in the magnetic tape player with the transducer head held in an operative position.

With respect to the movement of the protective covering 30 between the projected position and the retracted position, it can be effected in many methods. One of these metods as illustrated in FIGS. 3 to 6 is the use of a pair of pushers generally indicated by 41 and carried by a movable carrier plate 42. The movable carrier plate 42 is a support for the transducer assembly, which in the instance as shown is composed of a pair of transducer heads 43 rigidly mounted thereon in side-by-side relation to each other. The movable carrier plate 42 is movable between inoperative and operative positions in any known manner. By way of example, when a known "PLAY" button is depressed to bring the magnetic tape player in position to reproduce the information which has been recorded on the magnetic tape or when a known "RECORD" button is depressed together with the PLAY button to bring the magnetic tape player in position to record information on the magnetic tape, the movable carrier plate 42 is moved from the inoperative position, as shown in FIGS. 3 and 6, to the operative position as shown in FIG. 5.

The pushers 41 are rigidly mounted on the movable carrier plate 42 on respective sides of the transducer assembly and are of the same construction as will subsequently be described with particular reference to FIG. 4.

As best shown in FIG. 4, each of the pushers 41 comprises a substantially cylindrical pin having both ends enlarged in diameter to provide an abutment 41a and 41b, a substantially intermediate portion 41c having a length slightly greater than the width of the magentic tape T.

With the above in mind, when the carrier plate 42 is moved from the inoperative position towards the operative position, the abutments 41a and 41b of the pushers 41 engage the respective front edges of the plate member 31 and 32 forming the protective covering 30, thereby pushing the protective covering 30 from the projected position towards the retracted position against the wire springs 34 and 35. Therefore, it is clear that, when the protective covering 30 is moved to the retracted position as shown in FIG. 5, that portion of the magnetic tape T which has been protected by the protective covering 30 in the manner as shown in FIGS. 3, 4 and 6, is then in a position out of the protective covering 30 and held in contact with the transducer heads 43 in readiness for recording or reproduction of information on the magnetic tape T.

In FIG. 5, the braking lever 23 is depicted as moved further beyond the inoperative position in the direction opposite to the operative position. This is because when the protective covering 30 is moved to the retracted position, the rear edges of the plate members 31 and 32 forming protective covering 30 engage the upright support 24a, thereby pushing the braking lever 23 beyond the inoperative position. However, if the length of the braking lever 23 is sufficiently smaller, no contact between the protective covering 30 and the braking lever 23, as described above, will occur as the protective covering 30 is moved towards the retracted position and, therefore, there will be no possibility that the braking lever 23 is moved further beyond the inoperative position. In such case, the slots 23a and 23b may be replaced by circular openings.

Figure 7:
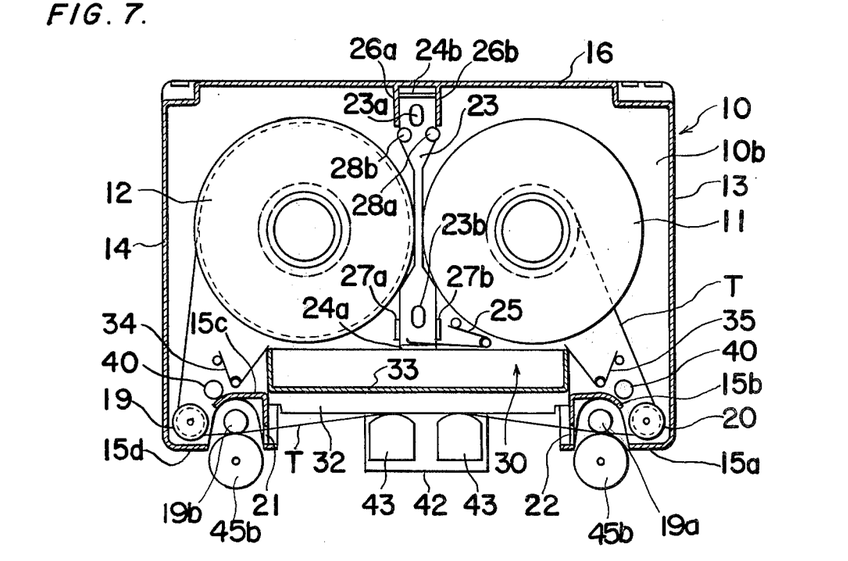
FIG. 7 is a view similar to FIG. 5, showing the tape container according to another embodiment of the present invention.

In the embodiment shown in FIG. 7, the heads 43 engage the front edges of the plate members 31 and 32 to push the protective covering from the projected position towards the retracted position as the carrier plate 42 is moved from the inoperative position towards the operative position against the wire springs 34 and 35.

In the embodiment shown in FIG. 8, the protective covering 30 may be moved from the projected position towards the retracted position independently of the movement of the carrier plate 42 from the inoperative position towards the operative position. This is because the braking lever 23 is connected with the protective covering 30 and, therefore, the movement of the braking lever 23 from the operative position towards the inoperative position by the operation of the manipulating mechanism or the stationary pin results in the movement of the protective covering 30 from the projected position towards the retracted position.

Alternatively, without the manipulating mechanism or the stationary pin being employed, the movement of both of the braking lever 23 and the protective covering 30 from the operative position towards the inoperative position and from the inoperative position towards the operative position, respectively, may be effected in response to the movement of the carrier plate 42 from the inoperative position towards the operative position in a substantially similar manner as hereinbefore described in connection with the movement of the protective covering 30 in the embodiment of FIGS. 1 to 6.

It is to be noted that, when the carrier plate 42 is returned from the operative position towards the inoperative position, the protective covering 30 in the case of the embodiments of FIGS. 1 to 6 and FIG. 7, or the protective covering 30 and the braking lever 23 in the case of the embodiment of FIG. 8, can return to the original position by the biasing force of wire springs 34 and 35. It is also to be noted that, pinch rollers 45a and 45b respectively cooperative with the capstans 19a and 19b are also moved towards the associated capstans 19a and 19b to drive the tape T when the carrier plate 42 is moved from the inoperative position towards the operative position as is well known to those skilled in the art.

Irrespective of whether the protective covering 30 is connected with the braking lever 23 such as shown in FIG. 8 or whether the protective covering 30 is separate of the braking lever 23 such as shown in FIGS. 1 to 7, a further method of moving the protective covering 30 from the projected position towards the retracted position can be employed, which further method will now be described with particular reference to FIG. 9.

Figure 9:
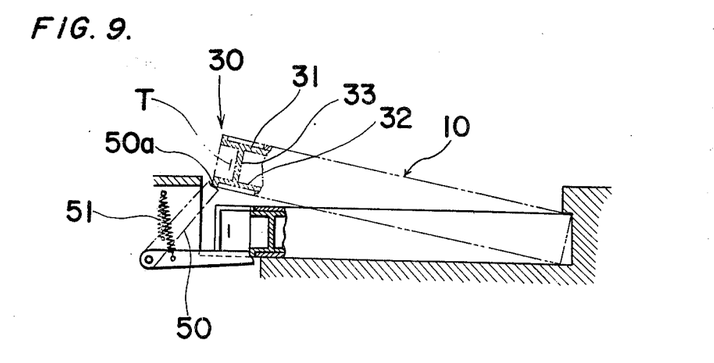
FIG. 9 is a partial side sectional view of the tape container and a portion of the magnetic tape player, illustrating another method of opening a protective covering at the access opening in the tape container.

Referring now to FIG. 9, a pivotable lever 50 having one end pivotally connected to a fixed portion of the framework of the magnetic tape player and the other end formed with an engagement recess 50a is utilized, a substantially intermediate portion of pivotable lever 50 loosely extending into the interior of the cassette receiving chamber of the magnetic tape player through one of the side walls of the cassette receiving chamber which is adjacent the front of the cassette 10. This pivotable lever 50 is pivotable between lifted and lowered positions and is normally biased to the lifted position, as indicated by the chain line, by the action of a spring element 51, for example, a tension spring. The pivotable lever 50 has such a length that, when the cassette 10 is completely placed within the cassette receiving chamber of the magnetic tape player as shown by the solid line, the protective covering 30 constituted substantially by the plate members 31 and 32 is moved to the retracted position.

The pivotable lever 50 of the construction as hereinbefore described can be operable in the following manner.

When the cassette 10 is placed in the cassette receiving chamber with the rear thereof inserted first as shown by the chain line, the front edge of the plate member 32 forming a part of the protective covering 30 rests on the engagement recess 50a. As the cassette 10 is pushed from the top thereof by the application of a finger pressure, the pivotable lever 50 held in the lifted position starts to pivot towards the lowered position while applying a pushing force to the plate member 32 and, therefore, the protective covering 30 through the engagement recess 50a. At the time of completion of the pivotal movement of the lever 50 to the lowered position as shown by the solid line, the protective covering 30 completes its movement from the projected position to the retracted position as shown also by the solid line.

Figure 10:
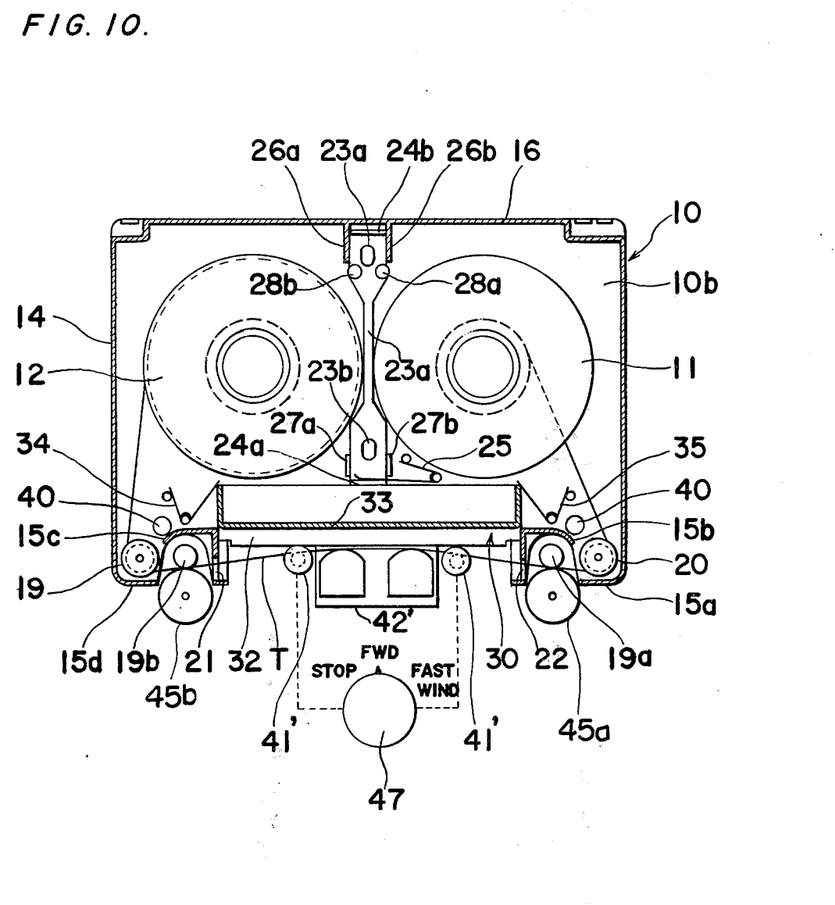
FIG. 10 is a view similar to FIG. 5, showing a further method of opening the protective covering.

FIG. 10 illustrates an example wherein the movement of the protective covering 30 from the projected position towards the retracted position is effected by the movement of the pushers 41' which is in turn effected by a manipulating knob 47 independently of the movement of the carrier plate 42', and, therefore, the transducer head assembly, it being understood that the movement of the carrier plate 42' is effected in any known manner and as hereinbefore described in connection with the carrier plate 42 in the embodiment of FIGS. 1 to 6.

The manipulating knob 47 so far illustrated has three stops designated respectively by "STOP", "FWD" and "FAST WIND". When the manipulating knob 47 is set to the STOP position while the carrier plate 42' is held in the inoperative position, the pushers 41' are separated from the protective covering 30 which is then held in the projected position. When the manipulating knob 47 is turned to the FWD position in which condition the carrier plate 42' is moved to the operative position with the transducer heads 43 held in contact with the magnetic tape T, the pushers 41' are moved to move the protective covering 30 towards the retracted position. When the manipulating knob 47 is further turned to the FAST WIND position, the pushers 41' are separated from the protective covering 30 irrespective of the positioning of the carrier plate 42 to allow the fast winding of the magnetic tape T from one reel to the other reel. During the fast winding, the heads 43 may be either engaged to the tape T or separated from the tape T. However, it is to be noted that, while rotation of the knob 47 between the STOP and FWD positions require a manual operating procedure each time the knob 47 is desired to rotate from the STOP position to the FWD position and vice versa, the manipulating knob 47 which has been rotated to the FAST WIND position will automatically be returned to the FWD position once a manually applied rotating force is removed.

From the foregoing description of the present invention, it is clear that, because of the protective covering 30 of the particular construction as hereinbefore described, the access opening for the transducer head assembly can be available in a relatively large width. This means that the arrangement makes it possible to employ two or more magnetic transducer heads located in side-by-side relation to each other. The result is such that the recording and/or reproducing characteristics of the magnetic tape player can be improved. In addition, since the reels 11 and 12 are braked when not in use and out of the cassette receiving chamber of the magnetic tape player, slackening of the magnetic tape will not occur.

Although the present invention has been fully described in conjunction with the preferred embodiments thereof with reference to the accompanying drawings, it is to be noted that various changes and modifications are apparent to those skilled in the art. For example, in order to bias the protective covering 30 to the projected position in the embodiments except for that of FIG. 8, a single spring element, such as a wire spring or a leaf spring, may be employed. In addition, unlike the embodiment of FIG. 8 wherein the upright support 24a is integrally formed with the protective covering 30, the braking lever 23 may have such a length that the upright support 24a is constantly engaged to the rear edges of the plate members 31 and 32 forming the protective covering 30.

Therefore, such changes and modifications are to be understood as included within the true scope of the present invention unless they depart therefrom.

What is claimed is:

1. A tape container for accommodating therein a magnetic tape designed for use in a magnetic recording and/or reproducing apparatus of the type having a container receiving chamber, as least one recording and/or reproducing transducer supported in position for movement between engaged and disengaged positions, and at least one capstan and an idler wheel cooperative with said capstan for driving the magnetic tape, said tape container comprising:

a housing of generally rectangular configuration including first and second generally rectangular spaced plate members and a peripheral wall extending between said first and second plate members along three of the sides thereof;

a first access opening means, defined in said housing along the fourth side thereof, for allowing access to a portion of the magnetic tape and for receiving the transducer when moved to the engaged position thereof so that the transducer may engage said portion of the magnetic tape;

first and second reels to which respective ends of the magnetic tape are secured, said first and second reels being rotatably supported within said housing in spaced relation to each other, each of said first and second reels having at least one radially outwardly extending flange;

second and third access opening means defined in said housing along said fourth side thereof and at opposite sides of the first access opening for selectively alternately receiving therethrough, when the tape container is placed within the container receiving chamber, the capstan in readiness for driving the magnetic tape from either of one of the said first and second reels towards the other of said first and second reels in cooperation with the idler wheel;

protective covering means, supported by said housing at a position aligned with said first access opening means, for movement between projected and retracted positions in a direction perpendicular to a plane of said portion of the magnetic tape and in a plane parallel to said first and second plate members of the housing, said protective covering means when in said projected position covering said portion of the magnetic tape;

means for biasing said protective covering means to said projected position thereof; and said protective covering means, when moved to said retracted position thereof against said biasing means with the transducer held in the engaged position thereof, permitting said portion of the magnetic tape to be located outside of said protective covering means and exposed to the exterior through said first access opening means with the transducer contacting that portion of the magnetic tape.

2. A tape container as claimed in claim 1, wherein said protective covering means comprises a pair of plates and a spacer wall joining said plates together to provide a substantially H-shaped cross-sectional configuration, said spacer wall spacing said plates a distance greater than the width of the magnetic tape, said portion of the magnetic tape being accommodated along said spacer wall and within an area defined by said plates and spacer wall when said protective covering means is in said projected position thereof.

3. A tape container as claimed in claim 2, further comprising braking means supported within said housing for movement between first and second positions, and means for biasing said braking means to said first position, said braking means when held in said first position applying a braking force to both of said reels to halt idle rotation of said reels within said housing, said braking means being movable to said second position against said biasing means when the tape container is placed within the container receiving chamber of the apparatus.

4. A tape container as claimed in claim 3, wherein said braking means is integrally formed with said protective covering means, whereby, when said protective covering means is moved to said retracted position thereof, said braking means is moved to said second position thereof.

5. A tape container as claimed in claim 3, wherein said braking means is movable towards said second position thereof in response to the movement of said protective covering means from said projected position thereof towards said retracted position thereof with an end of said braking means engaged to said protective covering means.

6. A tape container as claimed in claim 1, further comprising braking means supported within said housing for movement between first and second positions, and means for biasing said braking means to said first position, said braking means when held in said first position applying a braking force to both of said reels to halt idle rotation of said reels within said housing, said braking means being movable to said second position against said biasing means when the tape container is placed within the container receiving chamber of the apparatus.

7. A tape container as claimed in claim 6, wherein said braking means is integrally formed with said protective covering means, whereby, when said protective covering means is moved to said retracted position thereof, said braking means is moved to said second position thereof.

8. A tape container as claimed in claim 6, wherein said braking means is movable towards said second position thereof in response to the movement of said protective covering means from said projected position thereof towards said retracted position thereof with an end of said braking means engaged to said protective covering means.

9. A tape container as claimed in claim 1, wherein said protective covering means is positioned within said housing.

* * * * *